| United States Patent [19] | [11] | 4,298,728 |
|---|---|---|
| Majewicz et al. | [45] | Nov. 3, 1981 |

[54] METHOD OF PREPARING HYDROXYETHYL ETHERS OF CELLULOSE

[75] Inventors: Thomas G. Majewicz, Chadds Ford, Pa.; Walter S. Ropp, Hockessin, Del.

[73] Assignee: Hercules Incorporated, Wilmington, Del.

[21] Appl. No.: 155,919

[22] Filed: Jun. 3, 1980

[51] Int. Cl.³ .......................... C08G 59/00; C08G 65/08
[52] U.S. Cl. ........................................ 536/96; 536/91; 536/95; 536/101
[58] Field of Search ...................... 536/91, 96, 101, 95

[56] References Cited

U.S. PATENT DOCUMENTS

| 2,831,852 | 4/1958 | Savage | 536/91 |
|---|---|---|---|
| 4,013,821 | 5/1977 | Engelskirchen et al. | 536/91 |
| 4,096,325 | 6/1978 | Teng et al. | 536/91 |
| 4,228,277 | 10/1980 | Landoll | 536/91 |

FOREIGN PATENT DOCUMENTS

| 2415154 | 10/1975 | Fed. Rep. of Germany . | |
|---|---|---|---|
| 2535311 | 2/1976 | Fed. Rep. of Germany . | |
| 408730 | 4/1934 | United Kingdom | 536/96 |
| 497671 | 12/1938 | United Kingdom | 536/96 |
| 1465934 | 3/1977 | United Kingdom . | |

*Primary Examiner*—A. Lionel Clingman
*Attorney, Agent, or Firm*—W. Stanley Alexander

[57] ABSTRACT

In preparation of hydroxyethyl ethers of cellulose, ethylene oxide efficiency of the reaction and solubility characteristics of the product are improved by using alkali cellulose which has been prepared in the presence of boric acid or a boric acid salt.

10 Claims, No Drawings

METHOD OF PREPARING HYDROXYETHYL ETHERS OF CELLULOSE

This invention relates to an improved process for the preparation of hydroxyethyl ethers of cellulose. More particularly, it relates to a process whereby the yield of the cellulose ether based upon the concentration of reagents employed is improved and at the same time the quality of the product is improved as compared to conventional processes.

Hydroxyethyl cellulose is a well-known and widely used water-soluble cellulose ether. Its relatively good water solubility and its good viscosifying powers make it extremely useful as a viscosifier in a great number of applications. For example, there is a large market for this material as a thickener for latex paints and there is likewise a large market for it as a thickener in joint cements and various types of mortar. Another relatively large market is as a suspension aid in emulsion polymerizations. In the immediate future it is forecast that another market, perhaps larger than those already covered, will be found in various aspects of petroleum recovery such as, for example, fracturing fluids and in drilling fluids, as well as for use as a flooding fluid in secondary and tertiary recovery operations.

Over the years, a number of processes have been proposed for the preparation of water-soluble hydroxyethyl cellulose. Basically all of these processes involve treating cellulose with alkali and reacting the resultant alkali cellulose with ethylene oxide. This can be effected in a dry process in which no additional diluent is added and the gaseous ethylene oxide reacts directly with the doughy or pasty alkali cellulose product. Preferably, however, the reaction is carried out via a slurry process wherein the alkali cellulose is slurried in an inert organic diluent for reacting with ethylene oxide. The preferred such diluent is a lower aliphatic alcohol, most preferably, a 3- or 4-carbon alcohol such as isopropyl or tertiary butyl alcohol.

Tertiary butyl alcohol (TBA) and isopropyl alcohol (IPA) are by far the preferred inert diluents for use in the preparation of hydroxyethyl cellulose. Between the two, however, it is not possible to select a preferred diluent. Each has its own strong and weak characteristics which are balanced by the strong and weak characteristics of the other.

TBA as a diluent is superior to IPA in terms of ethylene oxide efficiency. Ethylene oxide efficiency is defined as the ratio of moles of ethylene oxide add-on per anhydroglucose unit (i.e., M.S. of the product) to moles of ethylene oxide input per anhydroglucose unit, expressed as percentage. Thus, with TBA as the diluent, a preselected ethylene oxide add-on level can be achieved with a smaller ethylene oxide input than would be required to achieve that same level with IPA as the diluent. In general, the advantage is on the order of about 65% efficiency for TBA versus about 50% for IPA.

When IPA is used as the diluent, on the other hand, good solution quality of the hydroxyethyl cellulose is realized at a lower ethylene oxide add-on or M.S. level than is the case with TBA diluent. With IPA, excellent solution quality is achieved at an M.S. level of about 1.9 and up as opposed to 2.5 and up required for good solution quality using material prepared in TBA. Moreover, with IPA, it is usually noted that the product has a higher viscosity than does the product prepared in TBA.

Obviously, the development of a process in which one could realize the good efficiency of the TBA process in combination with the superior solution properties of the TBA process is much to be desired. Accordingly, a substantial amount of effort has been expended in this direction but such effort, to date, has met with little or no success. Now, according to this invention, a method is provided by which both objectives can be met using TBA as the diluent, and which also further increases the quality of the product prepared using TBA as the diluent.

In accordance with this invention, an improvement is effected in the process for preparing hydroxyethyl ethers of cellulose wherein a cellulose furnish is reacted with an alkali metal hydroxide to prepare alkali cellulose and said alkali cellulose is slurried in a lower aliphatic alcohol and reacted with ethylene oxide or a mixture of ethylene oxide and a second etherifying agent, which improvement comprises carrying out the alkali cellulose preparation in the presence of boric acid or a salt of boric acid. The boric acid or boric acid salt is used in an amount equal to about 1 to 30%, preferably 3 to 20%, by weight based on the weight of dry cellulose.

The boric acid salts which can be used are any of the salts of orthoboric acid, i.e., those which ionize to form borate ions. These include any of the alkali metal borates such as sodium and potassium orthoborate and the various hydrates thereof. The most common borate and a preferred material to use is sodium tetraborate decahydrate, also known as borax.

The effects of the process according to the invention are particularly noticeable when TBA is used as the diluent. A measurable increase in ethylene oxide efficiency is noted even above the inherently high efficiency normally experienced with TBA. More significant, however, is the dramatic improvement in solubility characteristics of hydroxyethyl cellulose produced by the process.

Solubility characteristics are evaluated by three parameters:

(a) Solution granularity—defined as undissolved gel particles, is measured on a subjective scale from 0–5, with 0 signifying the lowest granularity level;

(b) Solution quality, which is a subjective measure of the clarity of a solution of the polymer in water; and (c) The ethylene oxide add-on or M.S. level required to achieve good ratings in (a) and (b).

The solubility characteristics of hydroxyethyl cellulose produced by the process of this invention in TBA are dramatically improved in all three respects over those of hydroxyethyl cellulose produced in TBA in the absence of borate ions. In fact, solubility characteristics are improved to the point that they are comparable to those of hydroxyethyl cellulose produced conventionally in IPA.

When the process of the invention is carried out in IPA, the same effects are noted. In IPA, the improvements are less dramatic but nonetheless real.

The invention has been described to this point in terms of its utility in the preparation of hydroxyethyl ethers of cellulose. It is also useful in the preparation of water-soluble hydroxyethyl ethers of cellulose in which the hydroxyethyl radical is the principal substituent but in which a second substituent is also present, usually in a smaller amount. Thus it can be used in the preparation of, e.g., water-soluble propyl hydroxyethyl cellulose, ethyl hydroxyethyl cellulose, methyl hydroxyethyl cellulose, and carboxymethyl hydroxyethyl cellulose.

The invention is highly valuable in the preparation of so-called hydrophobically modified hydroxyethyl cellulose which contain, in addition to the hydroxyethyl radical in amounts sufficient to impart water solubility, a minor amount of a long chain (i.e., 10 to 24 carbon) alkyl group. These products are prepared by reacting hydroxyethyl cellulose with a $C_{10}$ to $C_{24}$ alkyl halide, epoxide, or acid to attach the long chain group. Only minor amounts of the long chain radical, on the order of about 0.2 to 3% by weight, are used to yield very sizable increases in solution viscosity while retaining water solubility. These products and their preparation are fully described in U.S. patent application Ser. No. 11,613, filed Feb. 12, 1979, and assigned to the assignee of this application.

The method of the invention is applicable with any type of cellulose furnish. Wood pulp and cotton linters are the most commonly used furnishes. In fact, by the method of the invention, it appears to be possible to upgrade a furnish to some extent. That is to say, a furnish which, for some reason, might be of marginal quality can produce a useful hydroxyethyl cellulose in the presence of borate ions. Any cellulose furnish will produce a better hydroxyethyl ether cellulose more efficiently in the presence of borate ions.

In carrying out the process of the invention, the borate compound is preferably dissolved in the alkali employed to prepare the alkali cellulose prior to steeping the cellulose therein. This avoids the necessity of preparing a separate solution of the borate compound. It is possible to carry out the process using a separate solution of the borate, but in addition to the additional handling that this requires, there is also the possibility of adding too much water with the borate solution so that the optimum water to cellulose ratio for alkali cellulose preparation is not maintained.

Etherification of the cellulose is carried out substantially the same as in the usual etherification. The only significant difference is that with the process of this invention substantially less ethylene oxide and, when used, less of the second etherifying reagent need be used to accomplish the same substitution level.

The invention is exemplified in the following examples. Solubility and ethylene oxide efficiency data for each example are recorded in the table following Example 5

EXAMPLE 1

To 32.4 parts (dry weight) cotton linters in a stirred autoclave reactor was added 316 parts anhydrous TBA. After sealing the reactor and degassing with $N_2$, 63 parts of 17.5% NaOH having 3.0 parts borax (sodium tetraborate decahydrate) dissolved therein was added. The mass was agitated for 60 minutes. Ethylene oxide was then added over a period of 5 minutes until a total of 24.0 parts had been added. The reaction was carried out at 45° C. for 1 hour, then at 60°–65° C. for 2 hours. The slurry was then cooled, neutralized, washed three times in 80% acetone, finally in 100% acetone and dried.

Simultaneously a control run was carried out in which no borax was employed.

EXAMPLES 2 and 3

The procedure of Example 1 was repeated using different lots of cotton linters as the cellulose furnish.

EXAMPLE 4

The procedure of Example 1 was repeated using IPA as a diluent.

EXAMPLE 5

The procedure of Example 1 was repeated using wood pulp as the cellulose furnish.

TABLE I

| Example No. | Cellulose Furnish[f] | [Borax][a] | Diluent | MS[b] | EO Efficiency | Viscosity[c] | Turbidity[d] | Granularity[e] |
|---|---|---|---|---|---|---|---|---|
| 1-C | B | 0% | TBA | 1.9 | 66% | 6400 | SH | 4 |
| 1 | B | 9.0 | TBA | 2.0 | 71 | 5900 | Cl | 1 |
| 2-C | C | 0 | TBA | 1.9 | 67 | 6000 | SH | 5 |
| 2 | C | 9.0 | TBA | 2.0 | 71 | 5100 | Cl | 1+ |
| 3-C | A | 0 | TBA | 2.3 | 65 | 5700 | Cl | 3 |
|  | A | 0 | TBA | 2.4 | 66 | 5200 | Cl | 2+ |
| 3 | A | 3.0 | TBA | 1.9 | 70 | 5750 | Cl | 2 |
|  | A | 9.0 | TBA | 1.95 | 70 | 6160 | Cl | 1 |
| 4-C | A | 0 | IPA | 1.9 | 47 | 6100 | Cl | 2+ |
|  | A | 0 | IPA | 1.8 | 46 | 6500 | Cl | 2+ |
|  | A | 0 | IPA | 1.9 | 48 | 5700 | SH | 3 |
| 4 | A | 9.0 | IPA | 2.0 | 52 | 6100 | Cl | 1 |
|  | A | 15.0 | IPA | 2.1 | 53 | 5950 | Cl | 1 |
| 5-C | D | 0 | TBA | 1.9 | 66 | 1740 | Cl | 4 |
| 5 | D | 9.0 | TBA | 2.0 | 71 | 1500 | Cl | 2 |

[a][Borax] = weight per cent based on cellulose.
[b]MS values based on weight gain, accounting for ash and per cent moisture.
[c]Brookfield viscosity of 1% aqueous solution at 30 rpm, room temperature, #4 spindle.
[d]SH = slightly hazy; Cl = clear.
[e]Granularity is measured on a subjective scale from 0–5, with 0 signifying the lowest granularity level.
[f]Furnishes A, B and C were cotton linters; furnish D was wood pulp.

EXAMPLES 6 and 7

Hexadecyl modified hydroxyethyl cellulose containing various levels of $C_{16}$ modifier was prepared using the following recipe:

| Ingredient | Parts/Part Dry Cellulose |
|---|---|
| TBA | 8.64 |
| Acetone | 0.95 |
| Water | 1.56 |
| 17.5% NaOH solution | 0.30 |
| Ethylene oxide | 1.50 |
| Hexadecyl bromide | 0.075 or 0.10 |
| Borax | 0.10 |

The cellulose furnish was wood pulp.

The borax was dissolved in the alkali solution and the TBA, acetone and water were mixed together. A stainless steel reactor, the alkali/borax solution and the solvent mix were purged with dry nitrogen. Most of the solvent mix was added to the reactor, followed by the alkali/borax solution. The wood pulp was then added as rapidly as possible, using a portion of the retained solvent to wash down the reactor wall. The mass was agitated under a nitrogen blanket for one hour at 15°–20° C.

Ethylene oxide was dissolved in the remaining solvent mix and added to the reactor in one addition. The reactor was sealed, the temperature was raised to 60° C., and held for 30 minutes, at which point the pressure had increased to 20 p.s.i.g. The temperature was then raised to 75° C. During the first hour at 75° C., the pressure dropped to 9 p.s.i.g. and remained there.

When the pressure stabilized at 9 p.s.i.g., hexadecyl bromide, dissolved in the solvent mix, was added and the temperature was increased to 95° C. for two hours.

At the end of the two hour period, the reactor was cooled to between 40° and 45° C., pressure was released and 45 parts 70% $HNO_3$ was added, dropwise, after which the pH of the mass was adjusted to 6.0 with glacial acetic acid. The product was separated on a sintered glass filter and washed four times with 80% acetone. A final wash was done with 100% acetone to reduce moisture content to about 1%, followed by drying overnight at 70° C.

In the following table, the increased etherification reagent efficiency (demonstrated by increased yield of product) and the increased solution viscosity resulting from the process of the invention are shown and compared with product prepared without borax.

| Ex. No. | $C_{16}H_{33}Br$** | Product Recovered* | wt. % $C_{16}$ Subst. | Viscosity*** 2% | 1% |
|---|---|---|---|---|---|
| 6-C* | 0.1 | 160 | 1.0 | 80,000 | 17,000 |
| 6 | 0.1 | 174 | 1.0 | 100,000 | 23,000 |
| 7-C* | 0.074 | 160 | 0.7 | 41,000 | 5,000 |
| 7 | 0.074 | 174 | 0.69 | 95,000 | 23,000 |

*Control - no borax
**Parts/part cellulose
***Centipoise, Brookfield viscometer, 6 r.p.m.

What I claim and desire to protect by Letters Patent is:

1. In the process for preparing hydroxyethyl cellulose wherein a cellulose furnish is reacted with an alkali metal hydroxide to prepare alkali cellulose and said alkali cellulose is slurried in a lower aliphatic alcohol and reacted with ethylene oxide, the improvement which comprises carrying out the alkali cellulose preparation in the presence of about 1 to 30%, based on the weight of cellulose of boric acid or a boric acid salt.

2. The process of claim 1 wherein the boric acid or boric acid salt is present in amount equal to about 3 to 20%.

3. The process according to claim 2 wherein the lower aliphatic alcohol is tertiary butyl alcohol.

4. The process according to claim 2 wherein the lower aliphatic alcohol is isopropyl alcohol.

5. The process according to claim 1 wherein the reaction is carried out in the presence of borax.

6. The process according to claim 3 wherein the reaction is carried out in the presence of borax.

7. The process according to claim 4 wherein the reaction is carried out in the presence of borax.

8. In the process for preparing a mixed cellulose ether wherein a cellulose furnish is reacted with an alkali metal hydroxide to prepare alkali cellulose and said alkali cellulose is slurried in a lower aliphatic alcohol and reacted with ethylene oxide and a second etherifying reagent, the improvement which comprises carrying out the alkali cellulose preparation in the present of about 1 to 30 %, based on the weight of cellulose, of boric acid or a boric acid salt.

9. The process of claim 8 wherein the second etherifying agent is a long chain alkyl halide.

10. The process according to claim 9 wherein the reaction is carried out in the presence of borax.

* * * * *